US007684134B2

(12) United States Patent
Tearney et al.

(10) Patent No.: US 7,684,134 B2

(45) Date of Patent: Mar. 23, 2010

(54) MICROSCOPE OBJECTIVES

(75) Inventors: Guillermo J. Tearney, Cambridge, MA (US); Constantinos Pitris, Aglandjia (CY); Milen Shishkov, Watertown, MA (US); Brett E. Bouma, Quincy, MA (US)

(73) Assignee: The General Hospital Corporation, Boston, MA (US)

( * ) Notice: Subject to any disclaimer, the term of this patent is extended or adjusted under 35 U.S.C. 154(b) by 843 days.

(21) Appl. No.: 10/542,966

(22) PCT Filed: Jan. 21, 2004

(86) PCT No.: PCT/US2004/001499

§ 371 (c)(1),
(2), (4) Date: Dec. 19, 2005

(87) PCT Pub. No.: WO2004/065994

PCT Pub. Date: Aug. 5, 2004

(65) Prior Publication Data

US 2006/0245087 A1 Nov. 2, 2006

Related U.S. Application Data

(60) Provisional application No. 60/441,558, filed on Jan. 21, 2003.

(51) Int. Cl.
*G02B 7/02* (2006.01)

(52) U.S. Cl. ........................ 359/821; 359/811; 359/819

(58) Field of Classification Search ................. 359/819, 359/811, 813, 821, 822, 824
See application file for complete search history.

(56) References Cited

U.S. PATENT DOCUMENTS 4,056,724 A * 11/1977 Harte ........................ 250/328
4,283,123 A 8/1981 Tojyo
4,411,525 A 10/1983 Ogawa
4,770,477 A 9/1988 Shafer
4,792,214 A 12/1988 Wickholm et al.
5,119,117 A 6/1992 Ames (Continued)

FOREIGN PATENT DOCUMENTS

JP 10118007 5/1998

(Continued)

OTHER PUBLICATIONS

"Modern Optical Engineering" Smith, W.J., McGraw Hill, NY, NY 2000.

(Continued)

*Primary Examiner*—Ricky L Mack
*Assistant Examiner*—Brandi N Thomas
(74) *Attorney, Agent, or Firm*—Dorsey & Whitney LLP

(57) ABSTRACT

A confocal microscope lens arrangement is provided. The confocal microscope lens arrangement includes a lens assembly housing which has a lens assembly, and an exterior housing including a distal end and a proximal end. The exterior housing is configured to allow the lens assembly housing to be placed therein, and translated between the proximal end and the distal end of the exterior housing to focus the lens assembly. The exterior housing has an aperture formed through a distal end thereof. The arrangement also includes an immersion media filling the volume of area between the exterior housing and the lens assembly housing.

18 Claims, 4 Drawing Sheets

102 104 103 108 100 202 204 110 106

102 104 108 100 204 110 106 202

U.S. PATENT DOCUMENTS

| | | | | |
|---|---|---|---|---|
| 5,123,743 | A | | 6/1992 | Feldman |
| 5,144,475 | A | | 9/1992 | Hayashi |
| 5,191,879 | A | * | 3/1993 | Krauter ...................... 600/109 |
| 5,229,883 | A | | 7/1993 | Jackson et al. |
| 5,235,465 | A | | 8/1993 | Hayashi |
| 5,500,767 | A | | 3/1996 | Maruyama et al. |
| 5,587,836 | A | | 12/1996 | Takahashi et al. |
| 5,687,022 | A | | 11/1997 | Robb |
| 5,757,464 | A | | 5/1998 | Volk |
| 5,808,813 | A | | 9/1998 | Lucey et al. |
| 5,808,814 | A | | 9/1998 | Kudo |
| 5,870,228 | A | | 2/1999 | Kreitzer et al. |
| 5,923,031 | A | | 7/1999 | Naya |
| 5,968,876 | A | | 10/1999 | Sochor |
| 5,997,472 | A | | 12/1999 | Bonnell et al. |
| 6,019,472 | A | | 2/2000 | Koester et al. |
| 6,215,549 | B1 | | 4/2001 | Suzuki et al. |
| 6,530,882 | B1 | | 3/2003 | Farkas et al. |
| 6,552,794 | B2 | * | 4/2003 | Garini ........................ 356/445 |
| 7,014,966 | B2 | * | 3/2006 | Pawloski et al. .............. 430/30 |

FOREIGN PATENT DOCUMENTS

| | | |
|---|---|---|
| JP | 2000330020 | 11/2000 |
| WO | 8911112 | 11/1989 |

OTHER PUBLICATIONS

"Analysis of Spherical Aberration of a Water Immersion Objective: Application to Specimens with Refractive Indices 1.33-1.40" D.S. Wan et al., Journal of Microscopy vol. 197, Pt. 3, Mar. 2000, pp. 274-284.

* cited by examiner

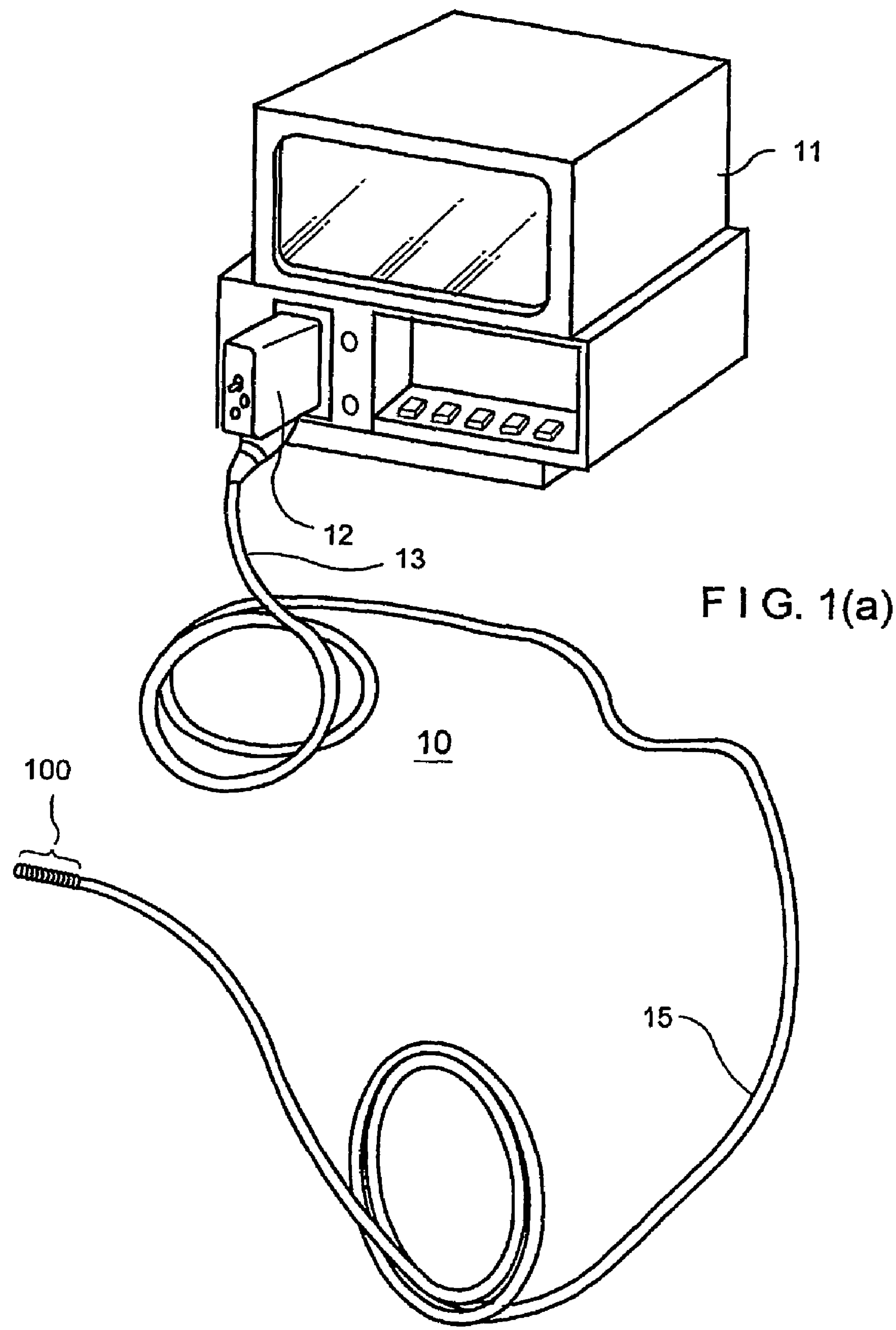
F I G. 1(a)

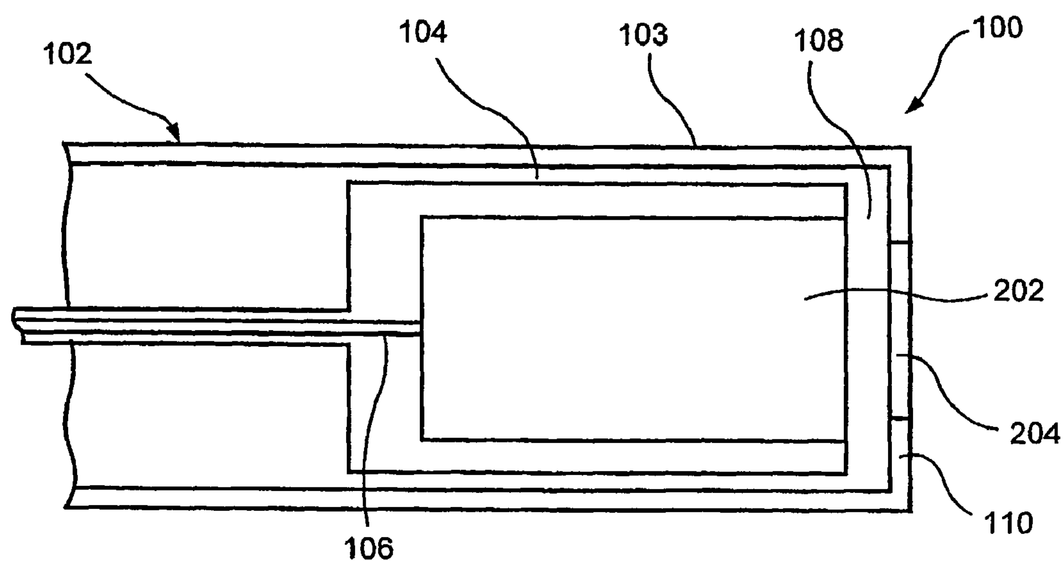
F I G. 2(a)
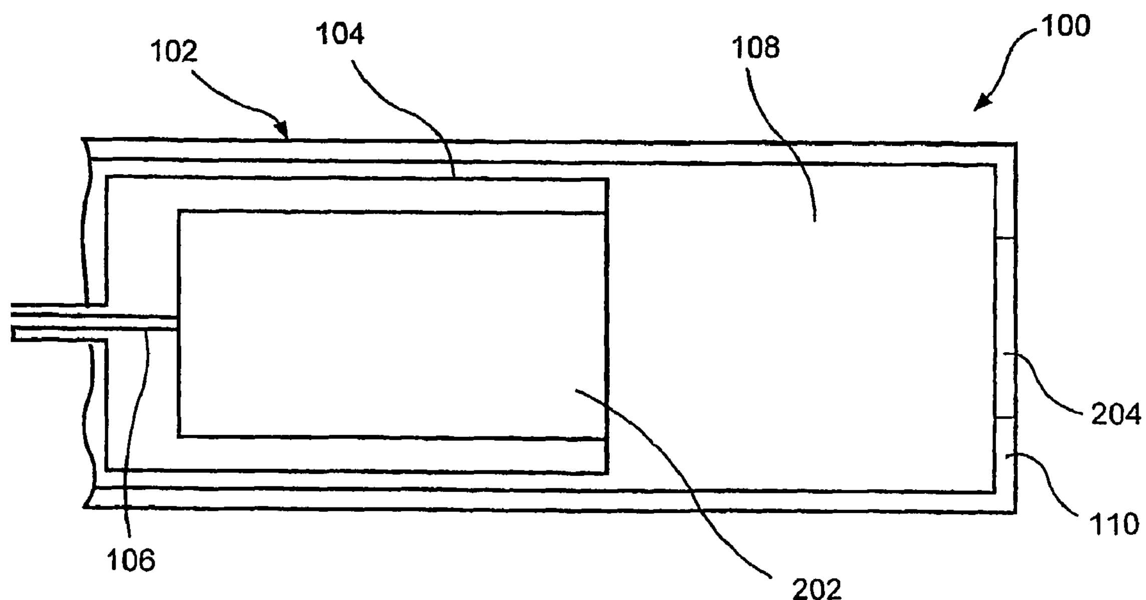
F I G. 2(b)

MICROSCOPE OBJECTIVES

CROSS-REFERENCE TO RELATED APPLICATION

The present application claims priority from U.S. Patent Application No. 60/441,558, filed Jan. 21, 2003, the entire disclosure of which is incorporated herein by reference.

STATEMENT REGARDING FEDERALLY SPONSORED RESEARCH

The invention was made with the U.S. Government support under Grant Number DAMD17-99-2-9001 awarded by the U.S. Department of the Army. Thus, the U.S. Government has certain rights in the invention.

FIELD OF THE INVENTION

The present invention relates to a microscope, and in particular to a confocal microscope which may be used to image accessible epithelial tissues in vivo.

BACKGROUND OF THE INVENTION

Medical imaging technology has advanced to provide physicians with indispensable information on the macroscopic anatomy of patients. Imaging techniques such as radiography, magnetic resonance imaging, computed tomography and ultrasound allow investigations of large-scale structures in the human body in a non-invasive manner with resolutions ranging from 100 μm to 1 mm. However, many disease detection procedures and/or analysis, such as the detection of early stages of a particular cancer, require a higher resolution of imaging for an accurate diagnosis. In addition, clinical procedures (such as screening for carcinoma and detecting surgical tumor margins) require the implementation of higher resolution diagnostic imaging methods. To address these and other clinical problems, a non-invasive imaging technology, with a resolution that approaches standard histopathology, should be used in conjunction with an endoscope, borescope, catheter or the like.

A borescope, endoscope, or similar flexible probe can be generally incorporated in an elongated flexible insertion tube with a viewing head at its distal or forward end. A conventional borescope has a thin bendable tubular steering section (or articulation section) at the distal end thereof adjacent to the viewing head which is generally steered from a control housing. A conventional endoscope has a thin tubular probe with a viewing head at the distal end thereof. The viewing head for either the borescope or the endoscope can include optical components (e.g., fiber optic or video, components such as a CCD imager). This viewing head can be situated in the distal end of the articulation section of the borescope or the distal end of the thin tubular probe of the endoscope. A signal conduit or bundle (which can be a wire bundle in the case of a video device or a fiber optic bundle in the case of an optical device) passes from the head through the insertion tube to exit to a suitable viewing device. A fiber optic bundle can also be used to carry illumination to the viewing head for illuminating a target in an enclosed area.

For a number of years, confocal microscopy has been an important research tool for investigating the microstructure of excised specimens. Traditionally, the use of confocal microscopy has been limited to being applied to accessible surfaces of the skin and the eye. The reason for this is that the only reliable methods for optical scanning should be performed in free space. In addition, the size of optical scanners generally prohibit their use in small probes such as endoscopes, borescopes, catheters and the like.

A confocal microscope may consist of a point source of light, a beam splitter and a lens assembly. The light is transmitted through the beam splitter and the lens or lens assembly, and then imaged into a sample to form an illuminated spot or resolution element. Light remitted from the sample is redirected through the lens or lens assembly (if present), the beam splitter, and towards the detector. The detector aperture size is approximately matched to the illuminated spot size through the intermediate optics. This conventional arrangement prevents an out-of-focus light from entering the detector. Thus, the light returning from above, below or to the side of the point illumination within the sample is not detected, and the volume of the resolution element is defined in three-dimensions. With a high numerical aperture microscope objective, these sections can be very small, e.g., on the order of several micrometers.

For this conventional system, an extremely small spot is illuminated at any one time, therefore a coherent image should be built up by scanning point by point over the desired field of view, and recording the intensity of the light emitted at each spot. Such scanning can be accomplished in several ways, one of the more common systems is laser scanning.

A number of publications describe the subject matter which my be relevant to the microscope of the present invention. For example, U.S. Pat. No. 6,215,549 describes an optical anisotropy measuring apparatus utilizing the total internal reflection ("TIR") method in the Background section thereof. As part of this TIR method, the refractive index matching liquid is filled between a liquid crystal device and each semispherical glass with the refractive index matching liquid having generally the same refractive index as the glass substrate and semispherical glass.

U.S. Pat. No. 6,019,472 describes a multi-layered contact lens element for at least one of examination and treatment of ocular tissues. The lenses used in the multi-layered contact lens element may be composed of various industry materials including SF4, SF8 or LASFN31.

U.S. Pat. No. 5,808,813 discloses a variable-focus variable-magnification optical coupler for coupling an endoscope to a variety of different cameras. The optical coupler includes an adjustment mechanism which is actuated to move a focus lens assembly and a zoom lens assembly along the length of the optical coupler relative to a camera mount to focus the optical coupler.

U.S. Pat. No. 5,191,879 discloses a variable focus camera system for a borescope or endoscope. The lens cell of the system is free to move distally or proximally, thereby changing the focal length of the lens assembly. A vent is provided in a flexible sleeve of the assembly to allow air to be introduced to or taken from the volume which is altered when the lens cell moves distally or proximally.

U.S. Pat. No. 5,144,475 discloses an objective lens system to be used within a microscope. The objective lens system includes six (6) lenses which are spaced apart from an object side. The system includes a first to a fifth lens displaced in order from an object side to an image formation side with a predetermined number of air spacings therebetween. A first lens of this system is a meniscus lens, and has a concave surface directed toward an object. The first lens has the characteristics of an aplanat lens and a field flattener. Such objective lens system is a variation of an "Amici type" lens.

U.S. Pat. No. 5,123,743 discloses a method of detecting defects in a lithography mask. An optical microscope (with an immersion lens, a top lighting, and a bright field) is used to detect spots of chrome which indicate imperfections. A refractive index-matching oil, which contacts both the lens and the glass or other surface, eliminates reflections from the glass, so only light scattering or reflections from the spots of chrome are seen. The refractive index-matching oil has a refractive index substantially identical to that of the glass or other surface.

U.S. Pat. No. 5,119,117 discloses an objective lens system. This optical lens system includes a first lens group and a second lens group. The first lens group is positioned closer to the focal point than the second lens group and includes a single aplanat. The second lens group includes a chromatic doublet.

Japanese Patent Document No. JP10118007 discloses an endoscope with a focus adjustment system, which has an actuator drive circuit to drive a piezoelectric actuator that moves a lens for the focus adjustment. The piezoelectric actuator moves the lens along an optical axis in order to focus the system.

SUMMARY AND OBJECTS OF THE INVENTION

It is therefore an object of the present invention to create a confocal microscope so as to obtain more accurate images of in-vivo samples through a miniature microscope objective probe head. Another object of the present invention is to utilize high refractive index materials to minimize the length of the miniature microscope objective probe head. Yet another object of the present invention is to enable a focusing of the miniature microscope objective probe head. And still another object of the present invention is to improve the quality of the images provided by the microscope by matching the refractive index of at least one optical element of the miniature microscope objective probe head with an immersion media and the substance into which the miniature microscope objective probe head is introduced.

In one exemplary embodiment of the present invention, a confocal microscope lens arrangement is provided. The confocal microscope lens arrangement includes a lens assembly housing with a lens assembly, and an exterior housing including a distal end and a proximal end. The exterior housing is configured to allow the lens assembly housing to be placed therein, and translated between the proximal end and distal end of the exterior housing to focus the lens assembly. The lens assembly housing also includes an immersion media filling the volume of area between the exterior housing and the lens assembly housing.

In another advantageous embodiment of the present invention, a microscope lens arrangement adapted to be used in-vivo is provided. The microscope lens arrangement includes a lens assembly which has at least one lens composed of various industry materials, such as, e.g., LASFN31, LASFN9, SF6, SF56, AMTIR1, AMTIR2, AMTIR3, Silicon, GE, Sapphire, ZnSe, ZnS, Cleartran, CVD, and/or GaAs, sized to be used in a confocal lens arrangement.

In still another advantageous embodiment of the present invention, a confocal microscope lens arrangement is provided. The confocal microscope lens arrangement includes a lens assembly with at least one lens, and a lens assembly housing having a first aperture provided in a distal end thereof. The lens assembly housing is dimensioned to accommodate the lens assembly. The lens arrangement is positioned such that at least one lens of the lenses is in registration with the aperture formed in the distal end of the lens assembly. The arrangement also includes an exterior housing having a second aperture formed through the distal end thereof, and enclosing the lens assembly housing therein. The arrangement may further include a coverslip which is positioned in registration with the second aperture, and an immersion media filling a volume of area between the exterior housing and the lens assembly housing. The immersion media has a refractive index which is similar to that of the coverslip and the lens of the lens assembly.

In yet another advantageous embodiment of the present invention, a confocal microscope lens arrangement is provided. The confocal microscope lens arrangement includes a lens assembly with a plurality of lenses, in which a first lens of the plurality of lenses is an aplanat lens, and a second lens of the plurality of lenses is a plano-convex lens. The first lens may be closer to a focal point of the lens assembly than the second lens, and the first lens of the plurality of lenses is the closest lens of the plurality of lenses to the focal point of the lens arrangement.

BRIEF DESCRIPTION OF THE DRAWINGS

For a more complete understanding of the present invention and its advantages, reference is now made to the following description, taken in conjunction with the accompanying drawings, in which:

FIG. 1(*b*) shows an exemplary embodiment of a miniature microscope objective probe head according to the present invention;

FIG. 2(*a*) shows an exemplary embodiment of a distal portion of the miniature microscope probe head according to the present invention in a first position;

FIG. 2(*b*) shows an exemplary embodiment of the distal portion of FIG. 2(*a*) in a second position;

DETAILED DESCRIPTION OF THE INVENTION

Figure 1B:
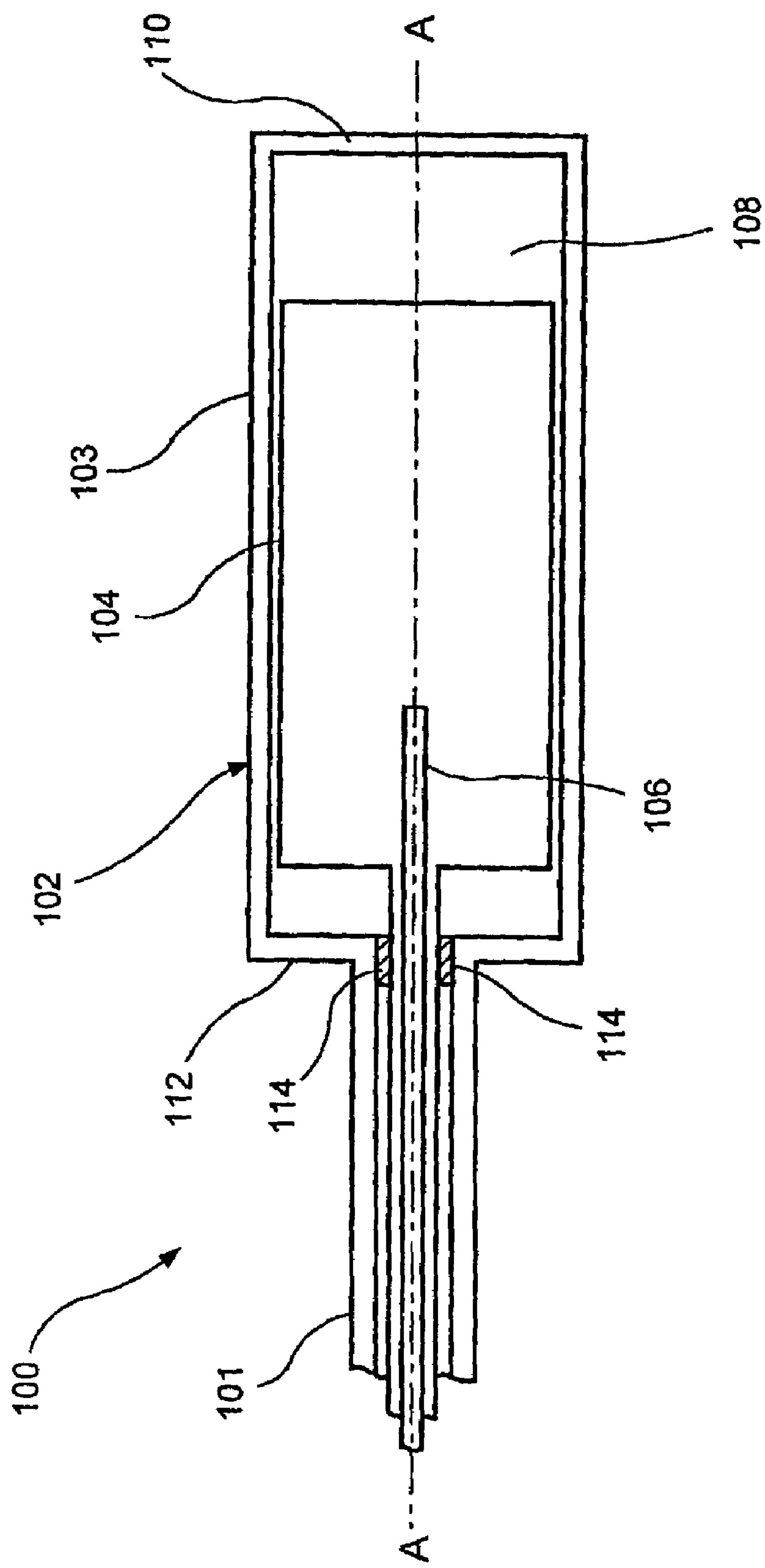
FIG. 1(*a*) shows an exemplary embodiment of an arrangement including an endoscope connected to an accompanying console according to the present invention.

FIG. 1(*a*) illustrates an endoscope arrangement 10 according to the present invention which has a video monitor and console 11 with a connector adapter 12 that connects the console 11 to an endoscopic probe 13. The endoscopic probe 13 includes an elongated flexible insertion tube 15 which extends distally from the console 11, and has a miniature microscope objective probe head 100 at its distal tip. The miniature microscope objective probe head 100 has optics therein is used to capture an image of a specimen (not shown). This can be done by inserting the endoscopic probe 13 into the body cavity of the subject.

FIG. 1(*b*) shows exemplary details the miniature microscope objective probe head 100. The miniature microscope objective probe head 100 may be used at the distal end of the endoscopic probe 13 of FIG. 1(*a*), borescopic probe, a catheter, or the like. The probe head 100 includes an exterior housing 102, a lens assembly housing 104, a control conduit 106, an immersion medium 108 and a seal 114.

The exterior housing 102 includes a distal portion 103 and a proximal portion 101. The distal portion 103 of the exterior housing 102 includes a distal wall 110 and a proximal wall 112. The distal portion 103 of the exterior housing 102 is dimensioned such that the lens assembly housing 104 fits within the distal portion 103 of the exterior housing 102, and may be translationally moved distally, i.e., toward the distal wall 110, or proximally, i.e., toward the proximal wall 112. Such translation of the lens assembly housing 104 can be performed within the distal portion 103 of the exterior housing 102, along a line A-A. The space between the distal portion 103 of the exterior housing 102 and the lens assembly housing 104 is filled with immersion medium 108.

A small radial clearance is provided between the outer edge of the lens assembly housing 104 and the inner wall of the distal portion 103 of the exterior housing 102. In an exemplary embodiment, the small radial clearance is on average 100 μm. This clearance allows the immersion medium 108 to flow from the space between the outer wall of the lens assembly housing 104 and the distal wall 110 of the distal portion 103 of the exterior housing 102 to the space between the lens assembly housing 104 and the proximal wall 112 of the distal portion 103 of the exterior housing 102. This occurs when the lens assembly housing 104 is translationally moved away from the distal wall 110 toward the proximal wall 112. Conversely, the small clearance allows the immersion medium 108 to flow from the space between the lens assembly housing 104 and the proximal wall 112 of the distal portion 103 to the space between the lens assembly housing 104 and the distal wall 110 of the distal portion 103 when the lens assembly housing 104 is translationally moved in the manner described above.

The seal 114 is provided to keep the immersion medium 108 contained within the distal portion 103 of the exterior housing 102. Respective portions of the lens assembly 104 and the control conduit 106 extend through an aperture formed through the seal 114. In an alternate embodiment of the present invention, the seal 114 is not utilized and the immersion medium 108 fills the entire space between the exterior housing 102 and the lens assembly housing 104.

The control conduit 106 extends the length of the proximal portion 101 of the exterior housing 102 and the elongated flexible insertion tube 15 (shown in FIG. 1(*a*)), and connects to the console 11 (also shown in FIG. 1(*a*)). The control conduit 106 includes a positional adjustment device and a flexible light conductive member (not shown). The positional adjustment device causes the lens assembly housing 104 to transitionally move within the exterior housing 102 along the axis described by the line A-A. For example, the flexible light conductive member may be an optical fiber.

Referring now to FIGS. 2(*a*) and 2(*b*), the distal portion 103 of the exterior housing 102 and of the lens assembly housing 104 are shown in greater detail. The lens assembly housing 104 contains a lens assembly 202. A lens of the lens assembly 202 that is intended to be closest to the focal point of the lens assembly 202 is placed in registration with an aperture formed through the distal end of the lens assembly housing 104. A coverslip 204 is placed into an aperture formed through the distal wall 110 of the distal portion 103 of the exterior housing 102. The coverslip 204, which may also be referred to as a window, has two sides. The first (internal) side of the coverslip 204 is in contact with the immersion media 108. The second (external) side of the coverslip 204 may be coated with a transparent polymer to prevent direct contact between the specimen being studied and the coverslip 204. The coverslip 204, the immersion medium 108, the lens of the lens assembly 202 that is intended to be closest to the focal point of the lens assembly, and the specimen all preferably have refractive indices which are similar.

In one particular embodiment of the present invention, the refractive indices of the coverslip 204, the immersion medium 108, the lens of the lens assembly 202 that is intended to be closest to the focal point of the lens assembly, and the specimen are within five percent (5%) of one another (e.g., with 5% of 1.38 index).

In another embodiment of the present invention, the transparent polymer may be OptiClad™ available from Optical Polymer Research, 5921 NE. 38th Street, Gainesville, Fla. 32609. In yet another embodiment of the present invention, the transparent polymer may have a refractive index of 1.38. In still another certain embodiment of the present invention, the entire coverslip 204 may be formed of the transparent polymer.

The lenses of the lens assembly 202 are preferably formed using high refractive index materials thereby allowing the lenses to be spaced closely together while minimizing aberrations. The use of high refractive industry materials, such as LASFN31, LASFN9, SF6, SF56, Sapphire, Cleartran, and ZnSe CVD, provides for a compact design of the lens assembly, while allowing for a minimization of the spherical aberration when taking images in the visual spectrum. When the images are taken in the infrared spectrum, the use of high refractive industry materials, such as AMTIR1, AMTIR2, AMTIR3, XXX, Germanium, Sapphire, ZnSe, ZnSe CVD, ZnS, Cleartran, GaAs and Silicon is preferred. The close element spacing of the lens assembly allows for an extremely compact design of the proposed device.

FIG. 2(*a*) shows the details of the lens assembly housing 104 which is positioned close to the distal wall 110 of the distal portion 103. FIG. 2(*b*) shows the details of the lens assembly housing 104 which is positioned further from the distal wall 110 of the distal portion 103 of the exterior housing 102. As the lens assembly housing 104 moves from its position as shown in the FIG. 2(*a*) to its position as shown in the FIG. 2(*b*), the immersion medium 108 flows along the small clearance between the radially outer edge of the lens assembly housing 104 and the interior wall of the distal portion 103 of the exterior housing 102 to accommodate the movement of the lens assembly housing 104. Conversely, as the lens assembly housing 104 moves from its position as shown in the FIG. 2(*b*) to its position as shown in the FIG. 2(*a*), the immersion medium 108 flows along the clearance between the radially outer edge of the lens assembly housing 104 and the interior wall of the distal portion 103 to accommodate the movement of the lens assembly housing 104.

Figure 3:
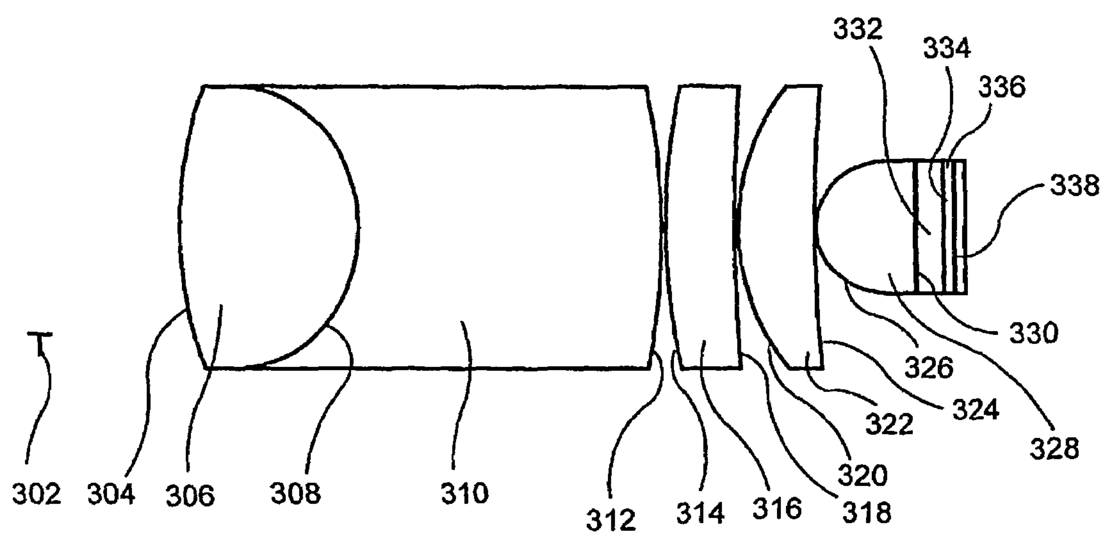
FIG. 3 shows a first exemplary embodiment of a lens assembly of the miniature microscope probe head of FIG. 1(*b*)

Referring to FIG. 3, a first exemplary embodiment of the lens assembly 202 and the coverslip 204 is shown, in which the lens assembly 202 includes nine (9) lens surfaces, which define four lenses. The following table describes the exemplary curvature, thickness and semi-diameter of each of the lens surfaces of the lens assembly 202, an aperture stop, and the coverslip 204 in accordance with the first exemplary embodiment of the lens assembly 202 and the coverslip 204:

| Lens Surface | Curvature (in $mm^{-1}$) | Thickness (in mm) | Semi-diameter (in mm) |
|---|---|---|---|
| Aperture Stop 302 | 0 | 1.800 | 1.80 |
| First Lens Surface 304 | 0.122 | 2.230 | 2.30 |
| Second Lens Surface 308 | −0.340 | 4.020 | 2.30 |
| Third Lens Surface 312 | −0.0561 | 0.050 | 2.11 |
| Fourth Lens Surface 314 | 0.0831 | 0.923 | 2.30 |
| Fifth Lens Surface 318 | −0.00748 | 0.0500 | 2.05 |
| Sixth Lens Surface 320 | 0.208 | 0.968 | 2.30 |
| Seventh Lens Surface 324 | 0.00878 | 0.0500 | 1.80 |
| Eighth Lens Surface 326 | 0.906 | 1.240 | 1.10 |
| Ninth Lens Surface 330 | 0 | 0.300 | 1.10 |
| First Coverslip Surface 334 | 0 | 0.150 | 1.10 |
| Second Coverslip Surface 336 | 0 | 0.214 | 1.10 |

The aperture stop 302 defines the light width to be provided to the lens assembly 202. The first lens surface 304 is nearest to the proximal end of the lens assembly housing 104, and the ninth lens surface 330 is nearest to the distal end of the lens assembly housing 104. The eighth lens surface 326 and the ninth lens surface 330 collectively define an aplanat lens 328. The aplanat lens 328 is the lens of the lens assembly 202 that is closest to the focal point of the lens assembly 202. The aplanat lens 328 is preferably constructed of a material with a refractive index approximately equal to that of the immersion media 108, the coverslip 204, and the specimen. A plano-convex lens 322 is defined by the seventh lens surface 324 and the sixth lens surface 320. The convex portion of the plano-convex lens 322 faces away from the aplanat lens 328. A plano-convex lens 316 is defined by the fifth lens surface 318 and the fourth lens surface 314. The convex portion of the plano-convex lens 316 faces away from the aplanat lens 328 and the plano-convex lens 322. A compound lens is formed by combining a plano-concave lens 310 and a convex-convex lens 306. The plano-concave lens 310 is defined by the third lens surface 312 and the second lens surface 308. The convex-convex lens 306 is defined by the second lens surface 308 and the first lens surface 304. The concave portion of the plano-concave lens 310 is preferably placed in direct contact with one of the convex portions of the convex-convex lens 306 to form the second lens surface 308. The plano-concave lens 310 and the convex-convex lens 306 form a doublet. The coverslip 204 is defined by the first coverslip surface 334 and the second coverslip surface 336.

Figure 4:
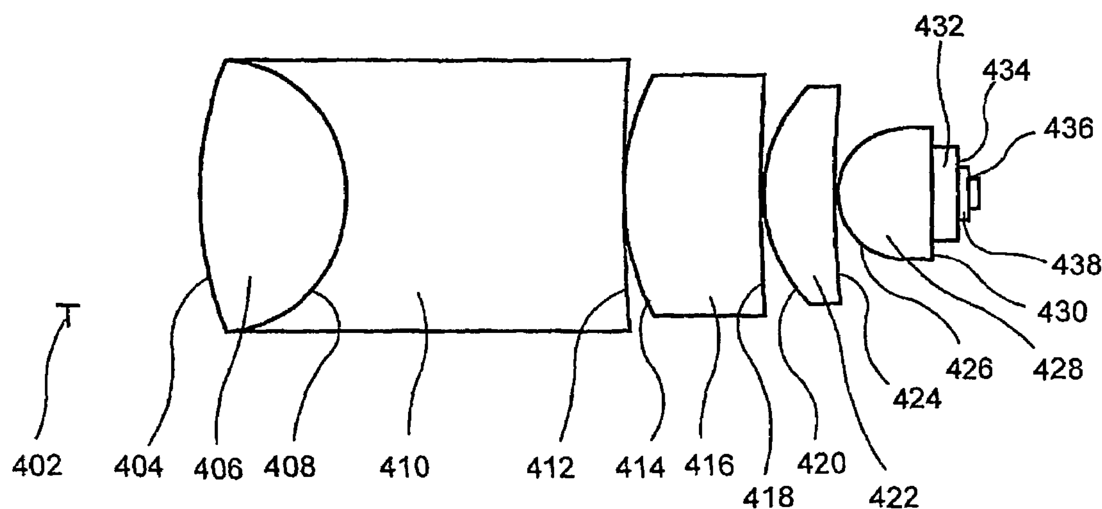
FIG. 4 shows a second exemplary embodiment of a lens assembly of the miniature microscope probe head of FIG. 1(*b*).

Referring to FIG. 4, a second exemplary embodiment of the lens assembly 202 and the coverslip 204 is shown in which, the lens assembly 202 also includes nine (9) lens surfaces, which define four lenses. The following table describes the curvature, thickness (measured from the center of one lens surface to the center of the next lens surface) and semi-diameter of each of the lens surfaces of the lens assembly 202, an aperture stop 402, and the coverslip 204 in accordance with the second exemplary embodiment of the present invention:

| Lens Surface | Curvature (in $mm^{-1}$) | Thickness (in mm) | Semi-diameter (in mm) |
|---|---|---|---|
| Aperture Stop 402 | 0 | 1.800 | 1.80 |
| First Lens Surface 404 | 0.0938 | 1.84 | 2.30 |
| Second Lens Surface 408 | −0.355 | 3.73 | 2.30 |
| Third Lens Surface 412 | 0.0428 | 0.05 | 2.01 |
| Fourth Lens Surface 414 | 0.156 | 1.77 | 2.05 |
| Fifth Lens Surface 418 | 0.0186 | 0.05 | 1.92 |
| Sixth Lens Surface 420 | 0.270 | 0.881 | 1.85 |
| Seventh Lens Surface 424 | 0.0336 | 0.05 | 1.71 |
| Eighth Lens Surface 426 | 0.901 | 1.26 | 1.10 |
| Ninth Lens Surface 430 | 0 | 0.334 | 0.783 |
| First Coverslip Surface 434 | 0 | 0.15 | 0.407 |
| Second Coverslip Surface 436 | 0 | 0.0873 | 0.238 |

The aperture stop 402 defines the light width to be provided to the lens assembly 202. The first lens surface 404 is nearest to the second end of the housing, and the ninth lens surface 430 is nearest to the first end of the housing. The eighth lens surface 426 and the ninth lens surface 430 collectively define an aplanat lens 428. The aplanat lens 428 is the lens of the lens assembly 202 that is closest to the focal point of the lens assembly 202. The aplanat lens 428 is preferably constructed of a material with a refractive index approximately equal to that of the immersion media 108, the coverslip 204, and the specimen. A plano-convex lens 422 is defined by the seventh lens surface 424 and the sixth lens surface 420. The convex portion of the plano-convex lens 422 faces away from the aplanat lens 428. A plano-convex lens 416 is defined by the fifth lens surface 418 and the fourth lens surface 414. The convex portion of the plano-convex lens 416 faces away from the aplanat lens 428 and the plano-convex lens 422. A compound lens is formed by combining a plano-concave lens 410 and a convex-convex lens 406. The plano-concave lens 410 is defined by the third lens surface 412 and the second lens surface 408. The convex-convex lens 406 is defined by the second lens surface 408 and the first lens surface 404. The concave portion of the plano-concave lens 410 is preferably placed in direct contact with one of the convex portions of the convex-convex lens 406 to form the second lens surface 408. The plano-concave lens 410 and the convex-convex lens 406 form a doublet. The coverslip 204 is defined by the first coverslip surface 434 and the second coverslip surface 436.

Those having ordinary skill in the art will understand that the above-described lens assembly arrangements according to the present invention, and other similar lens assembly arrangements can be utilized to project and receive visible light therethrough, and employ such visible light to image accessible epithelial tissues in vivo in the manner consistent with the present invention.

The foregoing exemplary embodiments merely illustrate the principles of the present invention. Various modifications and alterations to the described embodiments will be apparent to those skilled in the art in view of the teachings herein without departing from the spirit and scope of the invention being defined by the appended claims.

The invention claimed is:

1. A confocal microscope lens arrangement, comprising:

a lens assembly housing including a lens assembly;

an exterior housing including a distal end and a proximal end, the exterior housing configured to allow the lens assembly housing to be placed therein, and translated between the proximal end and distal end of the exterior housing to focus the lens assembly; and an immersion media filling the volume of area between the exterior housing and the lens assembly housing.

2. The confocal microscope lens arrangement of claim 1, wherein the exterior housing is dimensioned such that a clearance area is provided between the lens assembly housing and the exterior housing.

3. The confocal microscope lens arrangement of claim 2, wherein the clearance area is sized to allow a portion of the immersion media to flow from the distal end of the exterior housing to the proximal end of the exterior housing when the lens assembly is translated toward the distal end of the exterior housing.

4. The confocal microscope lens arrangement of claim 2, wherein the clearance area is subject to allow a portion of the immersion media to flow from the proximal end of the exterior housing to the distal end of the exterior housing when the lens assembly is translated away from the distal end of the exterior housing.

5. The confocal microscope lens arrangement of claim 1, wherein the distal end of the exterior housing has an aperture and a coverslip, and wherein the coverslip is placed in registration with the aperture.

6. The confocal microscope lens arrangement of claim 5, wherein the coverslip is composed of a transparent polymer with a refractive index of within five percent of 1.38.

7. The confocal microscope lens arrangement of claim 5, wherein the coverslip includes a first side and a second side, the first side being in contact with the immersion media, and the second side being coated with a polymer.

8. The confocal microscope lens arrangement of claim 7, wherein the polymer is transparent and has a refractive index of within five percent of 1.38.

9. The confocal microscope lens arrangement of claim 5, wherein the lens assembly housing includes a first end and a second end.

10. The confocal microscope lens arrangement of claim 9, wherein the lens assembly housing includes an aperture formed through the first end, and the lens assembly is in registration with the aperture in the second end of the lens assembly housing.

11. The confocal microscope lens arrangement of claim 10, wherein the lens assembly includes at least one lens.

12. The confocal microscope lens arrangement of claim 11, wherein the at least one lens of the lens assembly is in contact with the immersion media.

13. The confocal microscope lens arrangement of claim 12, wherein respective refraction indexes of the at least one lens of the lens assembly, the immersion media, and the coverslip are within five percent of one another.

14. The confocal microscope lens arrangement of claim 12, wherein respective refraction indexes of the at least one lens of the lens assembly, the immersion media, and the coverslip are within five percent of the index of 1.38.

15. The confocal microscope lens arrangement of claim 12, wherein respective refraction indexes of the at least one lens of the lens assembly, the immersion media and the coverslip are approximately 1.38.

16. The confocal microscope lens arrangement of claim 1, wherein the immersion medium is a fluid.

17. A confocal microscope lens arrangement comprising:

a lens assembly including at least one lens;

a lens assembly housing having a first aperture provided in a distal end thereof, the lens assembly housing being dimensioned to accommodate the lens assembly, the at least one lens of the lens assembly being in registration with the aperture formed in the distal end of the lens assembly housing;

an exterior housing having a second aperture formed through a distal end thereof, and enclosing the lens assembly housing therein;

a coverslip which is positioned in registration with the second aperture; and an immersion media filling a volume of area between the exterior housing and the lens assembly housing, the immersion media having a refractive index which is similar to that of the coverslip and the at least one lens.

18. A confocal microscope lens arrangement comprising:

a lens assembly including a plurality of lenses, wherein a first lens of the plurality of lenses is an aplanat lens, wherein a second lens of the plurality of lenses is a plano-convex lens, wherein the first lens of the plurality of lenses is closer to a focal point of the lens assembly than the second lens of the plurality of lenses, and wherein the first lens of the plurality of lenses is the closest lens of the plurality of lenses to the focal point of the lens assembly.

* * * * *